United States Patent [19]

Boucher et al.

[11] 4,248,554
[45] Feb. 3, 1981

[54] DOOR BORING JIG SYSTEM

[75] Inventors: August S. Boucher, Leominster; Clarence R. Haaker, Fitchburg, both of Mass.

[73] Assignee: Engineered Products Security Corporation, Leominster, Mass.

[21] Appl. No.: 80,535

[22] Filed: Oct. 1, 1979

[51] Int. Cl.³ .................. B23B 39/00; B23B 47/28
[52] U.S. Cl. ................................. 408/97; 408/108; 408/115 R; 408/241 B
[58] Field of Search .......... 408/97, 108, 109, 115 R, 408/115 B, 114, 241 B

[56] References Cited

U.S. PATENT DOCUMENTS

| | | | |
|---|---|---|---|
| 1,529,557 | 3/1925 | Simon | 408/97 |
| 3,048,062 | 8/1962 | Bass | 408/97 |
| 3,293,954 | 12/1966 | Russell et al. | 408/97 |
| 3,302,674 | 2/1967 | Russell et al. | 408/97 |
| 3,635,571 | 1/1972 | Roberts et al. | 408/97 |

Primary Examiner—Harrison L. Hinson
Attorney, Agent, or Firm—Joseph S. Iandiorio

[57] ABSTRACT

A door boring jig system for aligning a cross bore and edge hole in a door, including a pair of spaced clamping jaws; a bore hole in one clamping jaw locating the position of the cross bore; adjustment means for moving the clamping jaws toward and away from each other to adjust to the width of a door to be bored; a bushing mounting hole in the other clamping jaw aligned with the first bore hole; a split bushing having a flange at one end and a hinge at each end, each hinge including a pair of pins mounted in separate parts of the split bushing and a link pivotably mounted to both pins; each link being loosely fitted to at least one of the pins to enable the bushing parts to slide or translate as well as pivot or rotate relative to each other; guide means mounted between the clamping jaws remote from the first hole and bushing mounting hole and having an edge hole guide for defining the position of the edge hole; and edge bevel accommodator means including first and second mounting means carried by the guide means; and first and second accommodator members pivotably attached to the mounting means for locating the jig system on square and bevel edged doors.

11 Claims, 12 Drawing Figures

DOOR BORING JIG SYSTEM

FIELD OF INVENTION

This invention relates to an improved door boring jig system for aligning a cross bore and edge hole in a door.

BACKGROUND OF INVENTION

Boring jigs have been available for boring aligned cross bores and edge holes in doors for mounting latch and lock devices. Typically they include a pair of spaced jaws with a guide between them. One jaw carries a threaded bushing for engaging the threaded shaft of an auger or drill, the other a hole whose diameter matches that of the drill and which may have a raised anti-splinter edge. The guide has a hole in it sized to receive the auger bit or drill for drilling the edge hole. There are means to adjust the spacing between the jaws and means to clamp the jaws in the door. Since the anti-splinter edge is integral with the hole in the jaw, that hole can only accommodate one size drill. Similarly, since the bushing is threaded it receives but one size drill shaft and that must be threaded; thus power-driven drills are not useable. The edge hole guide accommodates but one size auger and also has no means to receive a power drill. In addition, there is no provision to alter backset distance or to accommodate for bevel edge doors. Without such accommodation latch and lock installations in bevel edged doors often do not properly mate with the plate in the door jamb. In one device there is a backset adjustment but it requires a screw driver to loosen and retighten a set screw; a splinter ring is mounted in the same way; and the backset guide uses fixed, vertically extending plates. For quick insertion and release of the cross bore auger or drill there is a split bushing which is secured by a bolt and nut. Typically this arrangement may result in overtightening, resulting in excessive thread wear, or undertightening, resulting in threads being stripped. The use of set screws to secure the splinter ring and adjustable backset guide requires the installer to carry a screw driver just for the set screws. Conventional jigs tend to be heavy, awkward, difficult to align and set, and require other supporting tools such as wrenches, hex keys and scales.

SUMMARY OF INVENTION

It is an object of this invention to provide an improved, simplified, lightweight door boring jig system.

It is a further object of this invention to provide such a jig system which provides a bushing mounting which can receive threaded or unthreaded bushings of various sizes for hand and power drills.

It is a further object of this invention to provide such a jig system having an easily removable and replaceable splinter ring.

It is a further object of this invention to provide such a jig system having a sleeve easily installable and removable in the edge hole guide to accommodate different size augers or drills, both power and hand operated.

It is a further object of this invention to provide such a jig system which provides moveable bevel accommodating members which inherently accommodate for any door edge bevel and position the cross bore at the proper distance from the edge for proper operation.

It is a further object of this invention to provide such a jig system which provides an easy and quick backset adjustment for accommodating different size latch mechanisms.

It is a further object of this invention to provide such a jig system which enables a quick and easy engagement and disengagement of augers or drills with a power drill.

The invention features a door boring jig system for aligning a cross bore and edge hole in a door. There is a pair of spaced clamping jaws with a first hole in one clamp locating the position of the cross bore and a bushing mounting hole in the other clamping jaw aligned with the first hole. There are adjustment means for moving the clamping jaws toward and away from each other to adjust to the width of a door to be bored and clamping means for clamping the jaw tightly to the door to be bored. A split bushing with a flange at one end and a hinge at each end mounts in the bushing mounting hole. Each hinge includes a pair of pins mounted in separate parts of the split bushing and a link pivotably mounted to both pins. Each link is loosely fitted, by means of a slot or an enlarged hole in the link, to at least one of the pins to enable the bushing parts to slide or translate as well as pivot or rotate relative to each other. Guide means are mounted between the clamping jaws remote from the first hole and bushing mounting hole and has an edge hole guide which defines the position of the edge hole to be drilled in the door. An edge bevel accommodator means includes first and second mounting means carried by the guide means and first and second accommodator members pivotably attached to the mounting means for locating the jig system on squared and bevel-edged doors.

In a preferred embodiment, the clamping jaws include a splinter ring mountable in the first hole to bear against the door and prevent splintering during boring. There is also included resilient detent means on either the splinter ring or the first hole, and a recess on the other for releasably locking the splinter ring in position so that the splinter ring can be easily removed and replaced with smaller or larger splinter rings to accommodate different sized cross bores. The split bushing may include either internal threads for engaging threads on an auger or drill shaft, or may be unthreaded to receive a smooth, unthreaded shaft. Either the bushing mounting hole or the split bushing includes a resilient detent means and the other a recess for engaging the resilient detent means so that the bushing may be easily removed and replaced.

The guide means may include an insert sleeve for reducing the diameter of the edge hole guide when smaller edge holes are to be drilled in the door. Either the guide means or the insert sleeve includes resilient detent means and the other a recess for engaging the resilient detent means to enable the sleeve to be easily removed and replaced.

There is provided an adapter socket which at one end engages with a conventional drill chuck and has at the other end a recess for receiving the end of an auger or drill. The recess includes a channel and a resilient gripping means in the channel for holding the end of a drill. The adapter socket may have at the end for engaging with a chuck a rod of any convenient shape, e.g. round, square, triangular, hexagonal; and the recess may also be any of a variety of shapes, e.g. round, square, triangular, hexagonal.

The accommodator members may include a long, straight edge for bearing on the door edge and thereby locating the jig system at the median of the longer and shorter sides of the beveled door. Each said mounting means may include a slide member movable toward and away from the door edge, and locking means for fixing the slide member in a selected position. The slide member typically includes a retaining device for holding the slide member in a selected position and yet permitting movement thereof from one position to another. An opening is provided between the first hole on the one clamping jaw and the guide means and between the guide means and the bushing mounting in the other clamping jaw, for evacuating shavings from the edge hole as it is drilled.

DISCLOSURE OF PREFERRED EMBODIMENT

Other objects, features and advantages will occur from the following description of a preferred embodiment and the accompanying drawings, in which.

Figure 1:
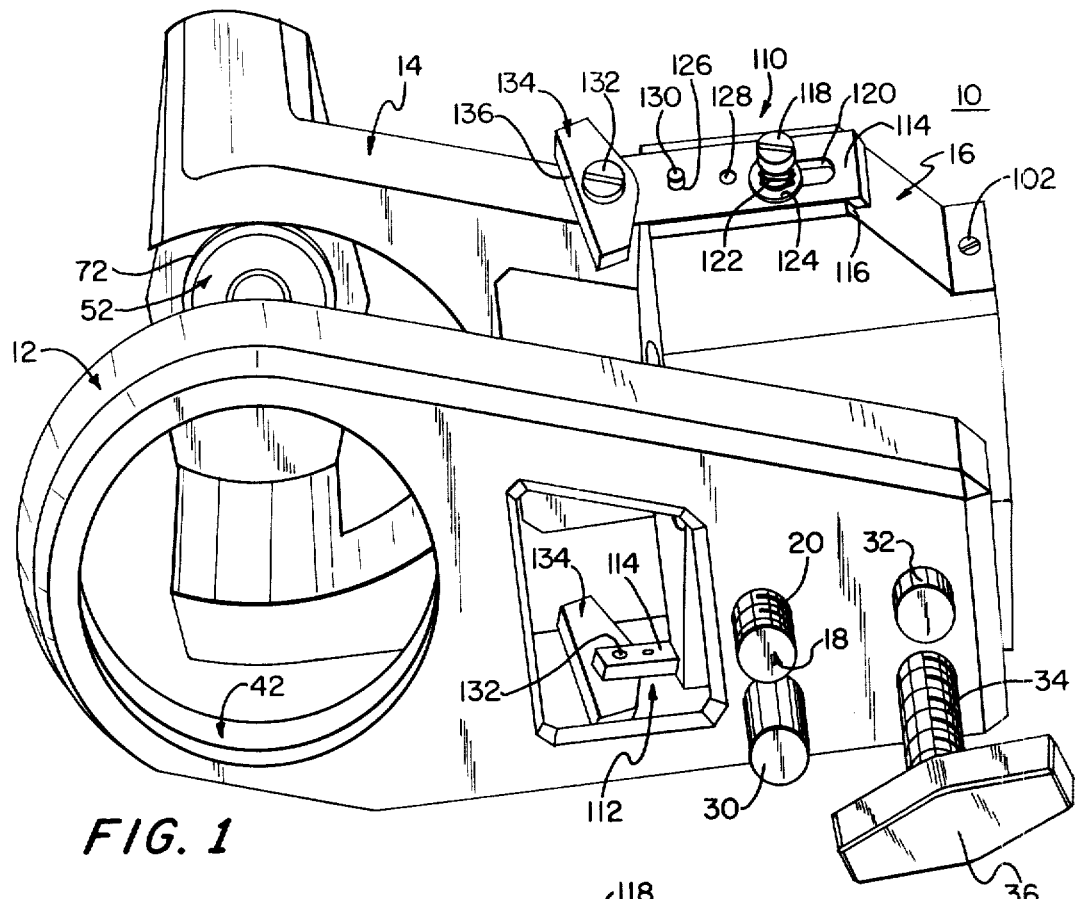
FIG. 1 is an axonometric view of a jig unit included in the door boring jig system according to this invention.

The door boring jig system of this invention may be accomplished using a pair of spaced clamping jaws in which there is a first hole in one of the clamping jaws locating the position of the cross bore, and a bushing mounting hole in the other of the clamping jaws aligned with the first hole for holding a bushing that guides the auger or drill used to make the cross bore in the door. The bushing is typically flanged and may be one piece with a smooth bore for receiving hand or power drills, or it may be a split hinged bushing and may have internal threads for engaging with the threads on an auger or drill typically driven by hand. The bushing is split through the center line with two hinges provided, one on each end for increased stability and to allow the bushing to expand sufficiently beyond the thread major diameter to engage and disengage the threads on the auger or drill shaft. Each hinge consists of a pair of pins, one on each part of the split bushing, and a link in which preferably at least one of the holes that engage the pins is enlarged or elongated to allow the parts to be translated or slid as well as rotated with respect to each other. Typically the bushings have a circumferential channel or recess which interlocks with a spring-loaded ball or other resilient detent that keeps the bushing in place in the bushing mounting hole. There are adjustment means which move the clamping jaws toward and away from each other to adjust to the various width doors with which it is to be used. Typically this is done by means of opposite threading on either end of a shaft which engages similar threading in each jaw. In between the jaws and rotatably mounted with respect to the adjustment means but not threadably engaged therewith is a guide means. After the adjustment means have been operated to fit the jig to a door, the clamping means are operated to tightly clamp the clamping jaws to the door.

The guide means includes an edge guide hole which is properly aligned with the center of the bushing mounting hole and the first hole in the clamping jaws. The diameter of the edge hole guide is made to fit a popular size edge hole auger or drill. One or more insert sleeves are provided for use in the edge hole guide when smaller drills or augers are to be used, and a quite reduced insert sleeve is used for guiding just the shaft of a power drill if one is to be used. These sleeves too have circumferential channels which engage a spring-loaded ball or other resilient detent to keep them in position. The first hole is adapted to receive a splinter ring, and the splinter ring has a circumferential channel for receiving a resilient detent such as a spring-loaded ball to keep it in position and permit it to be easily removed and replaced with larger or smaller splinter rings, depending on the size of the cross bore to be made in the door. To facilitate quick and easy switching from a cross bore power drill to an edge hole power drill, an adapter is provided in the system which has a shaft at one end for receipt in the chuck of a power drill, and in its other end a hole with a resilient pressure ring for gripping the shank of a high-speed drill. The shaft may be square, round, triangular, hexagonal, or any other shape desired for engagement with the chuck. The hole, too, may be any suitable shape compatible with the shape of drill to be received.

Figure 2:
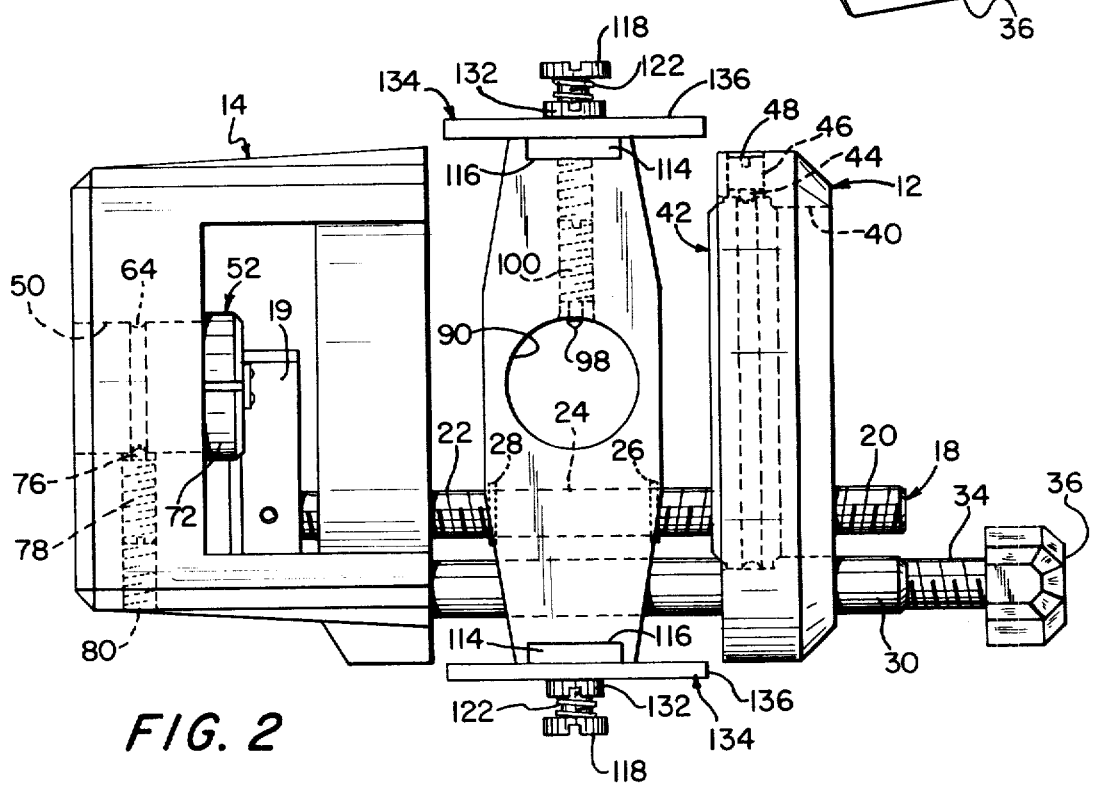
FIG. 2 is a front elevational view of the jig of FIG. 1.
Figure 9:
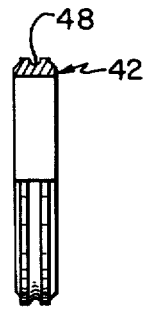
FIG. 9 is an edge view of a splinter ring according to this system.
Figure 10:
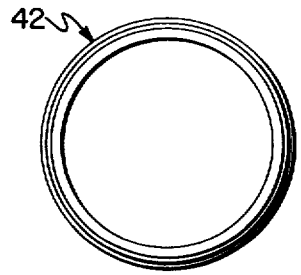
FIG. 10 is a front plan view of the splinter ring of FIG. 9.

There is shown in FIGS. 1 and 2 a jig 10 used in the system of this invention which includes jaws 12 and 14 and an edge hole guide 16. Adjustment means, screw 18, operated by handle 19, FIG. 2, moves jaws 12 and 14 toward and away from each other by means of reverse threads 20 and 22. Guide means 16 rides on unthreaded portion 24 of screw 18 between retainer rings 26 and 28. Jaws 12 and 14 are guided in their movement by pins 30, 32 and clamped by means of clamp screw 34 actuated by handle 36. Jaw 12 includes a hole 40 for receiving splinter ring 42, which is releasably held in position by ball 44 under pressure of spring 46, secured by set screw 48. Splinter ring 42, FIGS. 9 and 10, includes a circumferential channel 48 which engages ball 44.

Figure 3:
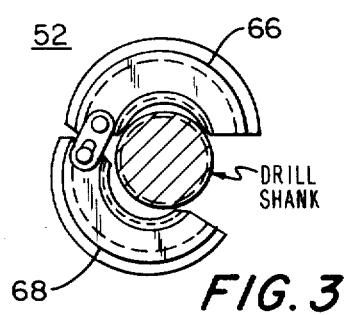
FIG. 3 is an end view of a split threaded bushing used in the door boring jig system of this invention.
Figure 5:
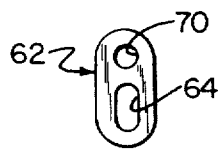
FIG. 5 is a view of a link used in each hinge of the split threaded bushing of FIGS. 3 and 4.
Figure 4:
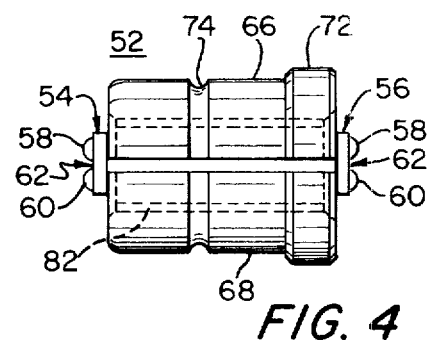
FIG. 4 is a side elevational view of the split threaded bushing of FIG. 3.

Clamping jaw 14, FIGS. 1 and 2, includes a bushing mounting hole 50 for receiving bushing 52. Bushing 52, FIGS. 3 and 4, includes a hinge 54, 56, at each end, each hinge being formed of a pair of pins 58, 60 pivotably interconnected by a link 62. Link 62, as shown in FIG. 5, includes at least one elongated or otherwise enlarged hole 64 for engaging one of pins 58 and 60 and allowing the two parts 66, 68, to slide or move translationally, as well as to pivot, with respect to each other. A second hole 70 may or may not be enlarged. Bushing 52 includes a flange 72 for preventing bushing 52 from being forced through bushing mounting hole 50 during cross boring of the door, and also includes a circumferential channel 74 for engaging with ball 76 under pressure of spring 78 secured by set screw 80.

Figure 6:
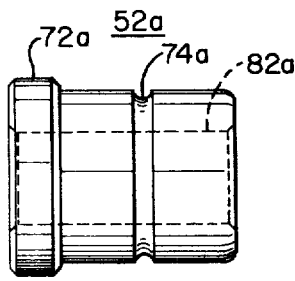
FIG. 6 is a side elevational view of an unthreaded, unsplit bushing similar to that shown in FIGS. 3 and 4.

Bushing 52 includes internal threads 82, but this is not a necessary requirement. For example, the inner bore of bushing 52 may be smooth as shown with respect to plane bushing 52a. FIG. 6, where like parts have been given like numbers accompanied by a lower case a with respect to FIGS. 3 and 4. Since bushing 52a contains no internal threads, it need not be split or hinged.

The pressure with which bushing 52 is held in mounting hole 50 and the pressure with which the two parts 56 and 58 are pressed together to bear on the threaded shank of the auger or drill may be carefully controlled by the adjustment of screw 80, which adjusts the compression of spring 78 and thus the force provided by ball 76, compressing parts 66 and 68 of bushing 52.

Also, the ease with which splinter ring 42 may be removed and replaced is controlled by adjusting set screw 48, which adjusts the compression of spring 46 and thus the force applied by ball 44 on splinter ring 42.

Figure 7:
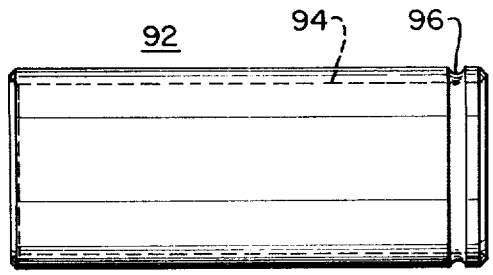
FIG. 7 is a side elevational view of an insert sleeve for the edge hole guide of the jig of FIG. 1.
Figure 8:
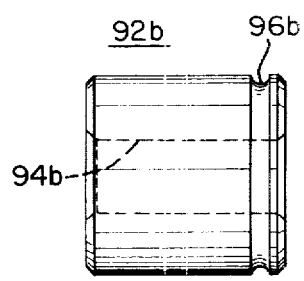
FIG. 8 is another form of insert sleeve for the edge hole guide of the jig of FIG. 1 which accommodates power drills.

Guide means 16, FIGS. 1 and 2, includes edge hole guide 90, which is used to guide a drill or auger. An insert sleeve 92, FIG. 7, may be placed in hole 90 to reduce the diameter and thereby adapt to a smaller diameter drill or auger, since the hole 94 in insert sleeve 92 is smaller than hole 90. A circumferential channel 96 is provided to engage ball 98 which operates under force of spring 100, adjusted by set screw 102. Alternatively, if a power drill is to be used, a smaller insert sleeve may be used. For example, in FIG. 8, where like parts have been given like numbers accompanied by a lower case b with respect to FIG. 7, insert sleeve 92b includes a much reduced diameter hole 94b for receiving the shank of a power drill.

Guide means 16 includes backset adjusting units 110 and 112, FIG. 1. Each adjusting unit includes a slide 114 moveable in channel 116 limited by bolt 118 in engagement with slot 120. Slide 114 is gently held in position by spring 122 bearing on washer 124. Backset adjustment is accomplished by aligning either hole 126 or 128 with pin 130. At the forward end of slide 114 and pivoted on bolt 132 is an accommodator member having a straight front forward edge 146. The ability of accommodator member 134 to pivot about bolt 132 enables member 134 to align with the edge of the door at whatever angle it may be with respect to the rest of the door. That is, the edge may be square or beveled left or beveled right. By so adjusting accommodator member 134 precisely aligns the center of hole 40 so that the latch when installed does not extend too much or too little, but just the proper amount for engaging with the plate in the door jamb.

Accommodator member 134 by aligning with the edge of the door, whatever may be its angle or bevel, establishes the backset at the median or halfway point between the shorter and longer ends of a beveled edge, and in this way properly sets the distance of the center of cross bore 40 from the position where the latch extends from the beveled edge. In use the backset may be adjusted, for example between the two positions illustrated, by gently lifting up the front of slide 14, that is the end proximate accommodator member 134, so that slide 114 is clear of the top of pin 130. Then the slide 114 is moved either forward or backward until the proper one of holes 126 and 128 aligns with pins 130 whereupon slide 114 is allowed to descend again into channel 116.

Figure 12:
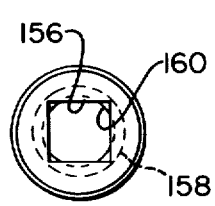
FIG. 12 is a front elevational view of the adapter of FIG. 11.
Figure 11:
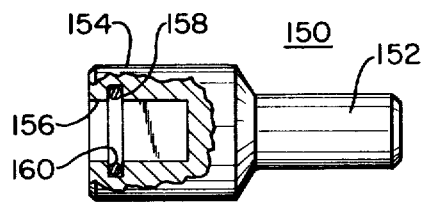
FIG. 11 is a side view with portions shown in section of a drill adapter.

Adapter 150, FIGS. 11 and 12, includes a cylindrical end 152 for engaging with the chuck of a power drill, and an enlarged cylindrical end 154 having a square hole 156 for receiving the square end of a drill shank. In the square hole 156 is recess 158 in which is located a circular spring element 160, which extends into the square hole 156 to provide a gentle gripping pressure on the shank of the drill. In this way various square shank drills may be engaged and disengaged with a power drill, speedily and without the need to lock and unlock the chuck. Alternatively, end 152 may be triangular, hexagonal, square or any other desired shape, as may recess 158.

Other embodiments will occur to those skilled in the art and are within the following claims.

What is claimed is:

1. A door boring jig system for aligning a cross bore and edge hole in a door comprising:

a pair of spaced clamping jaws; a first hole in one clamping jaw locating the position of said cross bore; adjustment means for moving said clamping jaws toward and away from each other to adjust to the width of a door to be bored; clamping means for clamping said jaws to said door to be bored; a bushing mounting hole in the other said clamping jaw aligned with said first hole; a split bushing having a flange at one end and a hinge at each end, mounted in the bushing mounting hole, each hinge including a pair of pins mounted in separate parts of the split bushing and a link moveable mounted to both pins; each said link being loosely fitted to at least one of said pins to enable said bushing parts to slide as well as pivot relative to each other;

guide means mounted between said clamping jaws remote from said first hole and bushing mounting hole and having an edge hole guide for defining the position of the edge hole; and edge accommodator means including first and second mounting means carried by said guide means and first and second accommodator members pivotably attached to said mounting means for locating said jig system on squared and beveled edge doors.

2. The jig system of claim 1 in which said clamping jaws include a splinter ring mountable in said first hole to bear against the door and prevent splintering during boring and resilient detent means on one of said splinter rings and first hole and a recess on the other for releasably locking said splinter ring in position.

3. The jig system of claim 1 in which said split bushing includes internal threads for engaging threads on a drill shaft.

4. The jig system of claim 1 in which one bushing mounting hole and said split bushing includes a resilient detent means and the other a recess for engaging said resilient detent means.

5. The jig system of claim 1 in which said guide means includes an insert sleeve for reducing the diameter of said edge hole guide.

6. The jig system of claim 5 in which one of said guide means and said insert sleeve includes a resilient detent means and the other a recess for engaging said resilient detent means.

7. The jig system of claim 1 further including an adapter socket having a rod at one end for engagement with a conventional drill chuck and a recess at the other end for receiving a drill end end, said recess including a channel and resilient gripping means in said channel for holding a said drill end.

8. The jig system of claim 1 in which said accommodator members include a long straight edge for bearing on the door edge.

9. The jig system of claim 1 in which each said mounting means includes a slide member movable toward and away from the door edge and means for locking said slide member in a selected position.

10. The jig system of claim 9 in which said slide member includes a retaining device for resiliently holding said slide member in a selected position and permitting movement thereof from one position to another.

11. The jig system of claim 1 in which there is an opening between said guide means and said first hole in said one clamping jaw and between said guide means and said bushing mounting in the other clamping jaw for evacuating shavings from said edge hole.

* * * * *